Figures 1, 1A:
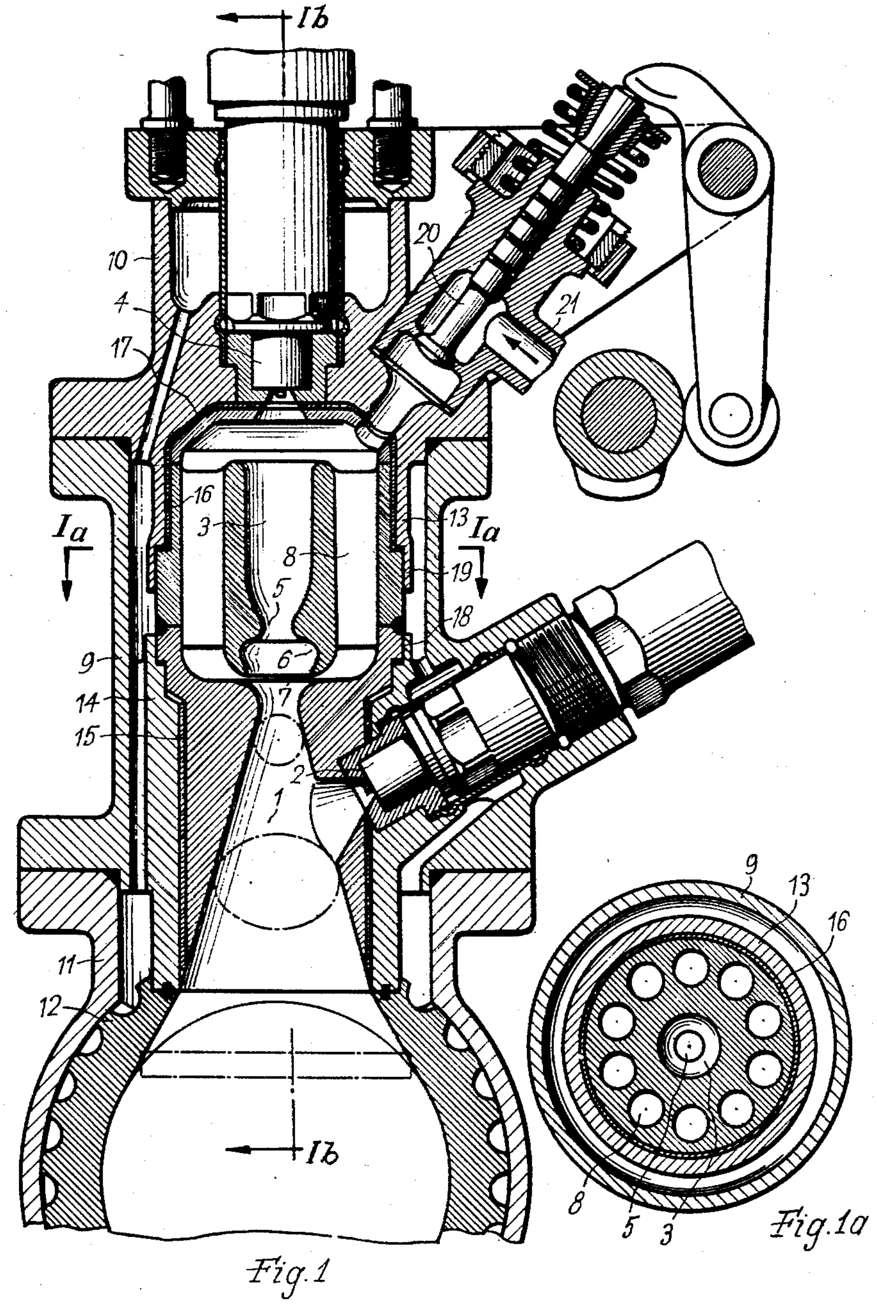

Nov. 24, 1959 H. RIESELER 2,914,042

INTERNAL COMBUSTION ENGINE

Filed May 19, 1955 4 Sheets-Sheet 1

Nov. 24, 1959 H. RIESELER 2,914,042
INTERNAL COMBUSTION ENGINE
Filed May 19, 1955 4 Sheets-Sheet 2
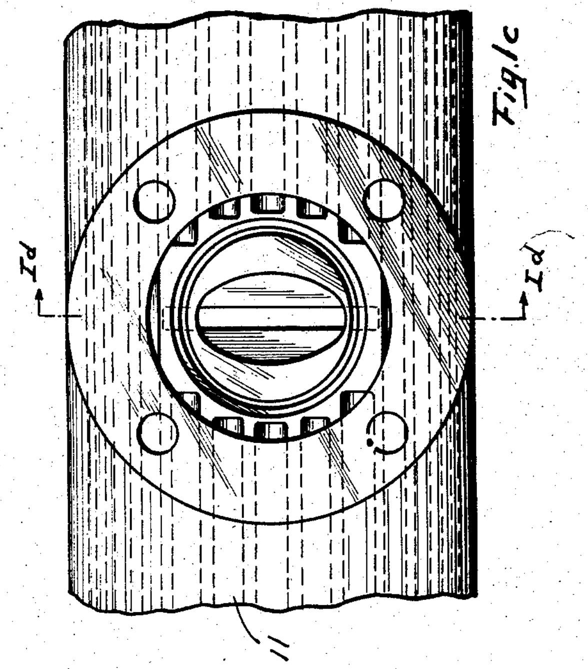
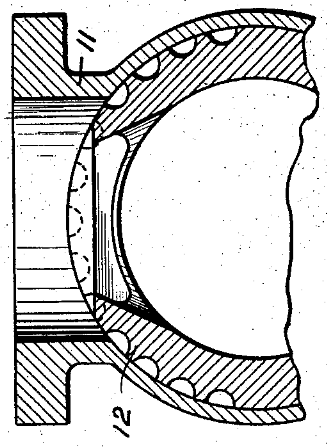
Fig. 1d
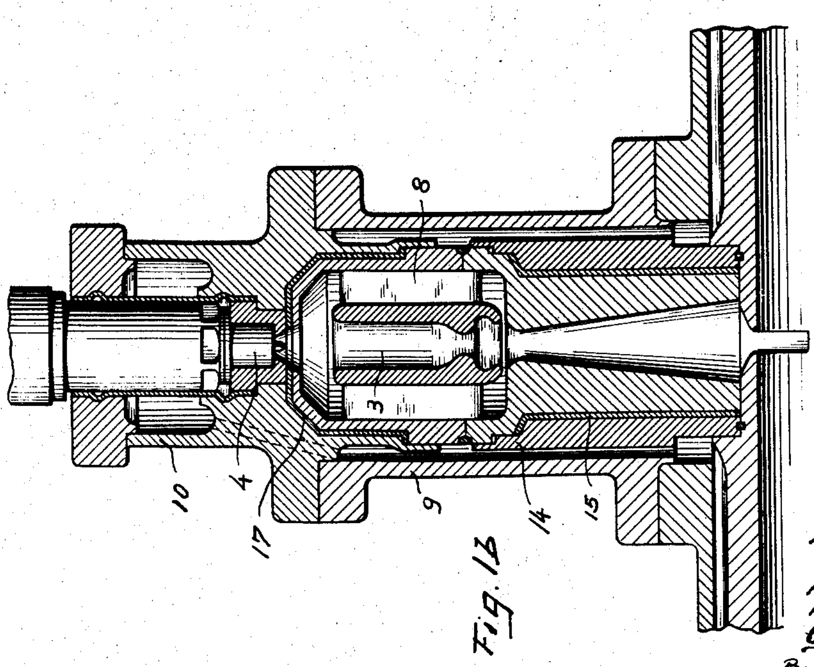
INVENTOR
Hermann Rieseler deceased
Helene Rieseler, née Scherber Legal representative
By Nov. 24, 1959 H. RIESELER 2,914,042

INTERNAL COMBUSTION ENGINE

Filed May 19, 1955 4 Sheets-Sheet 3

United States Patent Office 2,914,042

Patented Nov. 24, 1959

1

2,914,042

INTERNAL COMBUSTION ENGINE

Hermann Rieseler, deceased, late of Neidlingen (Teck), Germany, by Helene Rieseler, nee Scherber (heir), Neidlingen (Teck), Germany Application May 19, 1955, Serial No. 509,590
In Germany October 13, 1948

Public Law 619, August 23, 1954
Patent expires October 13, 1968

15 Claims. (Cl. 123—32)

The present invention relates to a method of conducting the combustion of a supercharged internal combustion engine and also concerns an internal combustion engine for carrying out said method.

The heretofore known diesel engines have the drawback that the conditions for the combustion gradually become worse during the course of the combustion in view of the fact that the combustion chamber is gradually becoming filled with burned gases. This drawback is encountered to an increased extent with postcharged and especially supercharged diesel engines. The poor exploitation of the charging air for the combustion therefore requires the employment of an increased excess in air. This in turn makes it necessary in order to obtain the desired high main piston pressure, to employ an unusually high charging air pressure. With the increase in the pressure of the charging air and thus with the increase in the weight of the air per cycle in the working cylinder, it will be obvious that with this type of internal combustion engines, in order to avoid too high a compression end pressure, the height of the applicable compression ratio, the maximum combustion temperature, and the useful heat drop and consequently the economy of the machine decreases. On the other hand, with the excess in air and with the necessary charging pressure, the required work for feeding the charging air increases. As a result thereof the machine requires more space and weight and its economy decreases further in conformity therewith.

It is, therefore, an object of the present invention to provide an internal combustion engine and a combustion method which will overcome the above mentioned drawbacks.

It is another object of this invention to provide an internal combustion engine, especially diesel engine which will have an increased power output over heretofore known diesel engines of the same dimension and will be particularly useful for diesel engines which have a reduced transmission.

It is also an object of this invention to provide an internal combustion engine of the type set forth in the two preceding paragraphs which will be of particular advantage for diesel engines used in connection with motor vehicles and ships.

These and other objects and advantages of the invention will appear more clearly from the following specification in connection with the accompanying drawings, in which:

Fig. 1 illustrates a section through a diesel engine according to the present invention for carrying out the method of this invention.

Fig. 1*a* is a section taken along the line I*a*—I*a* of Fig. 1.

Fig. 1*b* is a section along the line I*b*—I*b* of Fig. 1.

Fig. 1*c* is a view upon the flange to which the combustion chamber is connected, after removal of said combustion chamber.

Fig. 1*d* is a section along the line I*d*—I*d* of Fig. 1*c*.

Figs. 2, 3, 4 and 5 diagrammatically illustrate devices for supplying two injection nozzles of each working cylinder with fuel.

Figure 6:
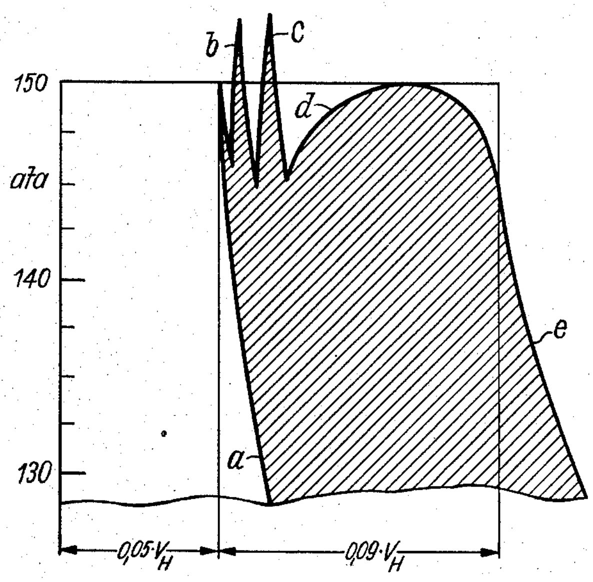

Fig. 6 illustrates by way of a graph the course of the pressure prior to, during, and following the combustion respectively.

2

*General arrangement*

The increased power output of a diesel engine of the type set forth above is obtained according to the present invention by correspondingly increasing the weight of charging air and fuel supplied to the diesel engine per cycle and to do this at an economically high compression ratio and at a low excess in air. More specifically according to the present invention unusually high combustion maximum pressures and temperatures are employed in connection with a fundamental improvement in the control of the formation of the mixture and in the control of the combustion process proper.

Starting from the finding that the degrees of efficiency of an internal combustion at given high combustion maximum pressures are highest when the increase in pressure up to said given maximum pressure is effected already during the compression instead of during the combustion only, the invention brings about an economic combustion at even pressure at an unusually high combustion maximum pressure of approximately 150 atmospheres absolute up to 170 atmospheres absolute and makes it possible to bring the compression end pressure up to nearly the combustion maximum pressure. As a result thereof, favorable compression ratios from approximately 1:16 to 1:18 are still obtained for high charging pressures of approximately 4 to 3.5 atmospheres absolute. However, due to the increase in pressure inherent to such combustion, it is rather difficult to prevent the high compression end pressure from being exceeded to any material extent.

This difficulty and other difficulties resulting from the required improvement in the use of the charging air for the combustion have been overcome according to the invention by sub-dividing the course of combustion into three combustion phases in connection with the employment of a positive feeding of the main portion of the combustion air in an especially high compressed and high heated condition to the fuel, and furthermore by designing appropriate devices for this purpose.

In the first combustion phase, the course of combustion starts with a partial combustion in a main combustion chamber holding approximately one-fourth to one-third of the total charging air. More specifically this combustion is effected with direct fuel injection and with normal excess in air. Within the second combustion phase, a second partial combustion is effected as intermediate combustion. This is carried out in an intermediate combustion chamber communicating with an air reservoir. This process is carried out with direct fuel injection from a separate fuel injection nozzle and furthermore with high excess in fuel. The said intermediate combustion is followed by a third combustion phase within which a third partial combustion is effected as main combustion with an unusually low excess in air. This is possible due to the fact that an excess in fuel is in form of glowing carbon particles blown from the intermediate combustion chamber into the small main combustion chamber and furthermore due to the fact that simultaneously high pressure air compressed further and heated further by the combustion pressure is blown from the air reservoir into the jet blown out from the intermediate combustion chamber and comprising unburned particles of decomposition contained in the main portion of the fuel which was introduced into the intermediate combustion chamber.

*Structural arrangement*

Referring now to the drawings in detail, the arrangement shown in Fig. 1 comprises primarily a pre- and main combustion chamber 1 with fuel injection nozzle 2, a contraction 5 with an adjacent mixing chamber 6 and an annular passage 7 arranged between the main combustion chamber 1 and an intermediate combustion chamber 3. As will be seen from the drawing, the chamber 1 communicates with the piston working chamber. The arrangement furthermore comprises an air reservoir or storage chamber 8 which in its turn communicates with the intermediate combustion chamber 3 and furthermore communicates through the annular passage 7 with the mixing chamber 6.

The combustion chambers 1 and 3 and the air storage chamber 8 are formed by an insert 1*a* which consists of high heat resistant material as for instance high-chromium steel alloy, said insert being arranged in the casing 9 and the head 10. The casing 9 is connected to the wall 11 of the cylinder which in this particular instance is a cylinder with two counter running pistons. The high gas pressures which occur in the interior of the combustion chamber insert 1*a* are absorbed by pressure resistant walls 13 and 14. The heat transfer to the said pressure resistant walls 13 and 14 may be reduced by inserts 15, 16 and 17 of a material which is a poor heat conductor, as for instance metal oxide ceramic. Where the durability of the fuel chamber insert requires a direct heat exchange with the cooling means surrounding the same, such heat exchange may be ascertained by testing the respective motor type and on the basis thereon the most favorable overlapping length of the wall portions 18 and 19 may be ascertained so that the heat exchange will be limited to the minimum permissible extent.

In order to improve the scavenging efficiency of the engine, the air storage chamber 8 may be provided with a small controlled scavenging valve 20 which opens only after a gas expansion has taken place in the piston working chamber. This scavenging valve 20 closes approximately at the end of the cylinder scavenging phase, i.e. substantially simultaneously with the closure of the outlet slots of the cylinder. The inlet 21 communicates with the scavenging air and charging air container. With large engines having a relatively low speed of rotation, the controlled scavenging valve 20 may be replaced by an automatically working check valve at the air storage chamber 8. Such check valve would open at the end of the gas expansion phase in the cylinder due to the then higher scavenging and charging air pressure. Such an automatic scavenging valve, however, requires a good cushioning of the valve movement. As to safety of operation, the automatic scavenging valve is inferior to the controlled scavenging valve.

The cross section of the passage from the combustion chamber 1 to the working cylinder is such that when two-stroke cycle counter running piston engines are involved, the cross section is circular at the start, then becomes oval and finally ends in a rectangular cross section as shown in the drawing. The said rectangular cross section ends as slot in in the cylinder between the two working pistons when the same occupy their inner dead center positions.

Figure 2:
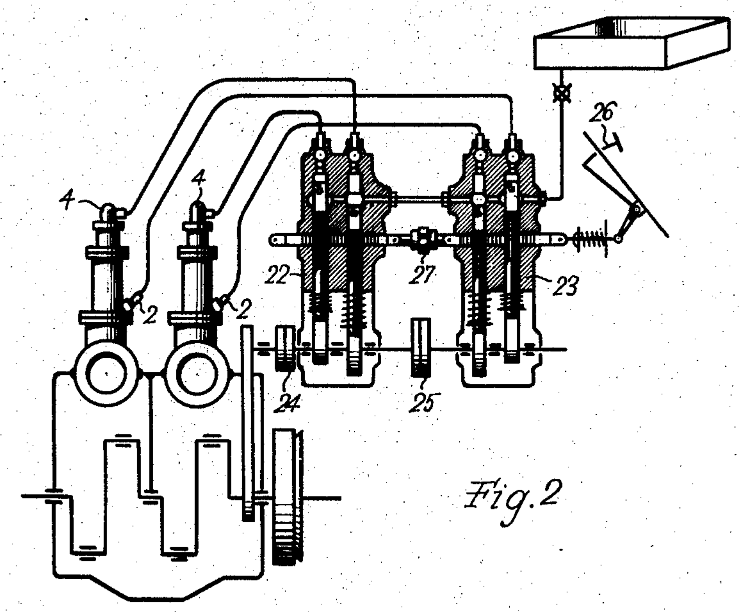

Each of the two fuel injection nozzles 2 and 4 is provided with a fuel feeding and control device of its own as shown diagrammatically in Fig. 2 and thus has for instance its own fuel injection plunger with control cam pertaining thereto. The main injection nozzle 4 has associated therewith a fuel feeding pump 22 with a plunger of a larger diameter, while the pre-injection nozzle 2 has associated therewith a feeding pump 23 with a pumping plunger of a smaller diameter. The cam shaft of the delivery pump 22 which shaft is driven by the crank shaft of the engine at the speed of rotation of said crank shaft may in a manner known per se for purposes of setting the start of the injection be adjusted at the clutch 24 relative to the engine crank shaft. For setting the lead of the injection start at the pre-injection nozzle 2, there is provided a setting clutch 25 between the two fuel delivery pumps 22 and 23. The control members for the two fuel delivery pumps 22 and 23 are operable by the pedal 26 and are interconnected by an intermediate member 27 the length of which is variable. This intermediate member serves to control the difference in the fuel injection period of the two injection nozzles 2 and 4. In other words the said intermediate member serves for setting the crank angle by which the fuel injection period of the pre-injection nozzle 2 ends ahead over that of the main injection nozzle 4. By means of this device, the injection output of each of the two injection nozzles can be set with regard to time and quantity individually for various conditions of load of the engine so as to obtain a most favorable result before by coupling the control members to each other at the most favorable distance, the common control is effected by the pedal 26 in conformity with the load.

Figure 3:
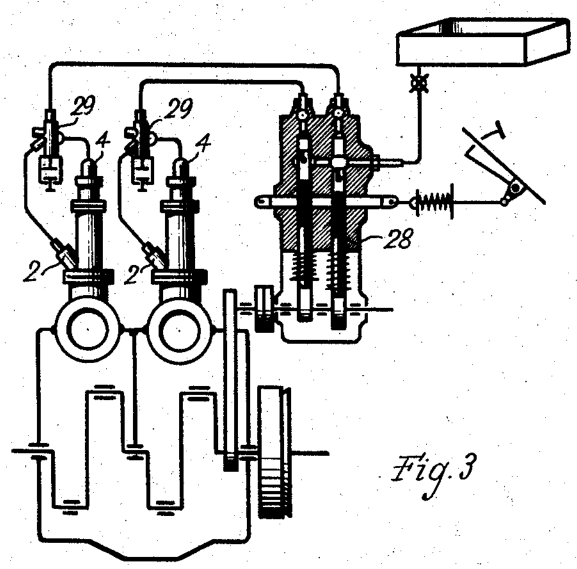
Figure 4:
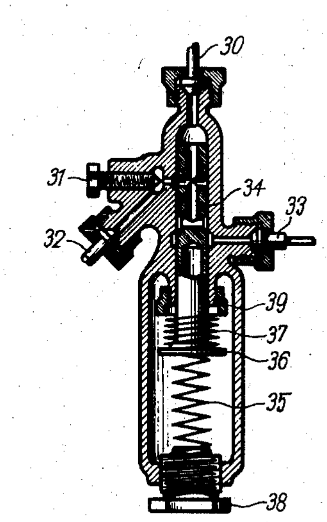

If a single pump plunger is to be employed as common to both injection nozzles 2 and 4, a control device has to be provided which out of the fuel quantity delivered per cycle feeds the first smaller portion to the injection nozzle 2 and the major portion of said fuel quantity to the injection nozzle 4. Such an arrangement is shown in Fig. 3. The fuel delivery pump 28 is provided with a pump plunger common to both the injection nozzle 2 and injection nozzle 4 of each motor cylinder, while the pressure conduit of said pump plunger leads to a distributor 29 shown in longitudinal section in Fig. 4.

The casing of this distributor has a connection for the fuel supply 30, a connection provided with a control screw 31 for the conduit 32 leading to the nozzle 2, and a connection for the pressure conduit 33 leading to the nozzle 4. Arranged in the distributor casing is a distributing valve 34 adapted by means of the fuel pressure in the feeding conduit 30 to be moved against the pressure of a spring 35. If such movement against the pressure of spring 35 takes place, the distributing valve interrupts the fuel supply through conduit 32 to nozzle 2 and only then opens the connection to the pressure conduit 33 which leads to the nozzle 4. The spring plate 36 which is is under the load of a counter spring 35 on one side is also under the load of a counter spring 37 on the other side. These two springs are so dimensioned that those pre-loads which are adjustable by means of the set screws 38 and 39 will balance each other when the distributing valve occupies its rest position in which the valve maintains the passage to the nozzle 2 open. The control of the fuel supply to the nozzle 2 is determined not only by the position of the control screw 31 but also by the pre-load of the two springs 35 and 37 as well as by the inertia of the valve 34. The pre-load on the springs and the inertia of the valve also determine the magnitude of the interval by which the start of the fuel injection through the nozzle 4 to the intermediate combustion chamber 3 trails the start of the fuel injection through the nozzle 4 into the pre- and main combustion chamber 1.

Figure 5:
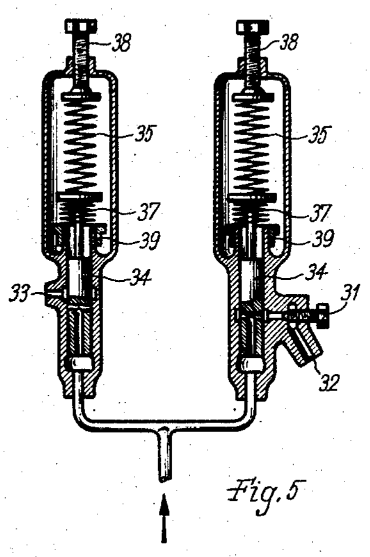

The control of the feeding of the two fuel injection nozzles 2 and 4 by means of a pump plunger common thereto may be facilitated by an arrangement diagrammatically illustrated in Fig. 5 of two shut-off valves 34 respectively for the two pressure conduits 32 and 33 because the spring load of each of the two smaller shut-off valves may be adjusted independently of each other.

The contraction 5 between the combustion chambers 1 and 3 as shown in Fig. 1 serves to produce a difference in pressure between the pressure in said two chambers during the compression phase. This difference in pressure may be increased by means of the almost rectangular enlargement toward the low pressure chamber 6 as shown in the drawing and also as a result thereof by the additional dynamic contraction of the air jet entering the chamber 3. This artificial contraction which occurs during the compression process only has about the same effect as if a portion of the chambers 3 and 8 were made ineffective. The compression ratio which is obtained without this additional contraction and may be for instance 1:14 to 1:16 is therefore obtained already prior to the completion of the compression stroke or the dynamic reduction in the effective passage brings about an increase in the effective compression ratio and a corresponding increase in the air density and the compression end temperature.

As shown in Fig. 6, the compression line *a* with the above mentioned working method may be brought up to approximately the respective combustion maximum pressure. This fuel pre-injection from the nozzle 2 starts with the control piston engine approximately at the inner dead center point with a small fuel quantity corresponding to the small contents of the combustion chamber 1 (Fig. 1). The combustion in the combustion chamber 1 starts after a very small ignition delay due to the unusually high air density at high compression end temperature and in the presence of bright red glowing walls of the fuel chamber insert which acts as heat accumulator. At the start of the combustion, a portion of the rather small fuel quantity has already evaporated and the cooling off therefore remains low due to the evaporating heat to be employed. Inasmuch as the working pistons during the start of the combustion are already engaged in the working stroke, and since the pressure in the piston working chamber has already started to drop, and since further a portion of the combustion gases can flow off to the intermediate chamber 3, there is no danger that the compression end pressure and the desired compression maximum pressure will be increased or exceeded to any material extent due to the increase *b* in pressure inherent to the combustion.

Approximately simultaneously with or shortly after the fuel jet enters the intermediate chamber 3 from the combustion chamber 1, the injection from the nozzle 4 into the intermediate chamber 3 takes place in which latter only a portion of this main fuel quantity will burn with particularly low ignition delay but with increased fuel excess. This is due to the fact that the introduced fuel encounters only the small air contents in the intermediate combustion chamber 3 and only the upper air layer of the air storage chamber 8.

During the increase in pressure in the chambers 3 and 8, the pressure in the piston working chamber and in the fuel chamber 1 again drops somewhat. The combustion pressure which increases in the second combustion phase *c* due to the intermediate combustion in the chamber 3 presses the unburned portion of the fuel introduced into the chamber 3 probably in the form of decomposed products through the contraction 5 into the low pressure and mixing chamber 6. Inasmuch as the effective passages are the same at 5 and at 7, and since the combustion pressure in chamber 3 also acts upon the air column in the air storage chamber 8, this higher compressed and heated air column is pressed through the annular passage 7 likewise into the mixing chamber 6 where the positive feeding of oxygen of the combustion air to the decomposed products of the fuel will occur. In this main phase of the combustion, the combustion is effected under favorable combustion conditions and at an unusually low excess.

In contrast to the combustion in a diesel engine in which the inertia high combustion velocity decreases during the course of the combustion, with the present new working methods according to the invention the combustion velocity increases in a desired manner due to the low excess in air in the main portion of the combustion course. Due to this main combustion, the combustion pressure which had dropped somewhat at the end of the second combustion phase *c* will in spite of the further progressing working stroke of the working piston of the engine (a two-stroke counter piston engine being assumed), again increase at the line *d* up to the height of the compression pressure and of the approximately equally high permissible combustion end pressure. The succeeding gas expansion line *e* runs corresponding to the respective selected charging pressure height, combustion pressure height and fuel injection period. When a pre-compression ratio of 1:15, a charging pressure height of 3.5 atmospheres absolute, a compression end pressure of 150 atmospheres absolute and a cylinder dead chamber volume of 5% of the piston displacement is employed, a cylinder filling is obtained which exceeds the dead chamber filling and amounts to approximately 9% of the piston displacement while an indicated mean piston working pressure of approximately 30 kilograms per square centimeter is obtained.

It is, of course, to be understood that the present invention is, by no means, limited to the particular construction and arrangement shown in the drawings but also comprises any modifications within the scope of the appended claims. Thus, for instance, the principle of the present invention is also applicable when the nozzle 2 is omitted so that only the nozzle 4 is employed.

What is claimed is:

1. In combination in a supercharged internal combustion engine: a cylinder; a compression chamber communicating with said cylinder; said compression chamber comprising a main combustion chamber communicating with said cylinder, an intermediate combustion chamber, and an air storage chamber surrounding said intermediate combustion chamber and communicating with said main combustion chamber and said intermediate chamber; restricted passage means provided between said main combustion chamber and said intermediate combustion chamber for effecting restricted communication therebetween; a mixing chamber arranged between said intermediate combustion chamber and said main combustion chamber; and nozzle means arranged adjacent one of said combustion chambers for injecting fuel thereinto.

2. In combination in a supercharged internal combustion engine: a cylinder; a compression chamber communicating with said cylinder; said compression chamber comprising a main combustion chamber communicating with said cylinder, an intermediate combustion chamber, and an air storage chamber communicating with said main combustion chamber and said intermediate chamber; restricted passage means provided between said main combustion chamber and said intermediate combustion chamber for effecting restricted communication therebetween; a first nozzle for injecting fuel into said intermediate combustion chamber; and a second nozzle operable independently of said first nozzle for injecting fuel into said main combustion chamber.

3. An internal combustion engine according to claim 2, in which the restricted passage means is so dimensioned in conformity with the delivery of said second nozzle that a pressure drop from the intermediate combustion chamber to the main combustion chamber of such magnitude will occur that a predetermined combustion end pressure will not be materially exceeded.

4. An internal combustion engine according to claim 2, in which the second nozzle delivers a smaller quantity of fuel per time unit than said first nozzle and that the delivery of fuel by said second nozzle precedes the delivery of fuel by said first nozzle by a variable time interval.

5. In combination in a supercharged internal combustion engine: a cylinder; a compression chamber communicating with said cylinder; said compression chamber comprising an insert forming a main combustion chamber communicating with said cylinder, an intermediate combustion chamber with a restriction between said main combustion chamber and said intermediate combustion chamber and also with an annular passage between said main combustion chamber and said intermediate combustion chamber, said insert also forming an air storage chamber surrounding said intermediate combustion chamber and communicating with said main combustion chamber and said intermediate combustion chamber; a mixing chamber arranged between said intermediate combustion chamber and said main combustion chamber; and nozzle means for injecting fuel into one of said combustion chambers.

6. In combination in a supercharged internal combustion engine: a cylinder; a compression chamber communicating with said cylinder; said compression chamber comprising a main combustion chamber communicating with said cylinder, an intermediate combustion chamber, and an air storage chamber communicating with said main combustion chamber and said intermediate chamber; restricted passage means provided between said main combustion chamber and said intermediate combustion chamber for effecting restricted communication therebetween; a first nozzle for injecting fuel into said intermediate combustion chamber; a second nozzle operable independently of said first nozzle for injecting fuel into said main combustion chamber, and separate fuel delivery and controlling means respectively associated with each of said fuel injection nozzles.

7. In combination in a supercharged internal combustion engine: a cylinder; a compression chamber communicating with said cylinder; said compression chamber comprising a main combustion chamber communicating with said cylinder, an intermediate combustion chamber, and an air storage chamber communicating with said main combustion chamber and said intermediate chamber; restricted passage means provided between said main combustion chamber and said intermediate combustion chamber for effecting restricted communication therebetween; a first nozzle for injecting fuel into said intermediate combustion chamber; a second nozzle operable independently of said first nozzle for injecting fuel into said main combustion chamber, a fuel delivery pump common to both of said nozzles, and distributing means connected to said delivery pump for distributing the fuel to said nozzles.

8. An internal combustion engine according to claim 7, in which said distributing means comprises first passage means arranged for communication with said first nozzle and also comprises second passage means arranged for communication with said second nozzle, valve means associated with said distributing means, spring means arranged to prevent said valve means from moving in a certain direction up to a certain pressure acting on said valve means, said valve means being operable in response to a certain fuel pump pressure against the pressure of said spring means successively to close said second passage means and to open said first passage means.

9. An internal combustion engine according to claim 8, which includes manually operable adjusting means associated with said distributing means for varying the effective cross section of said second passage means.

10. An internal combustion engine according to claim 7, which includes a pair of valve means associated with said distributing means for controlling the fuel distribution to each of said nozzles, and a pair of spring means respectively associated with said valve means and adjustable independently of each other to thereby control said valve means independently of each other.

11. In combination in a supercharged internal combustion engine: a cylinder; a compression chamber communicating with said cylinder; said compression chamber comprising a main combustion chamber communicating with said cylinder, an intermediate combustion chamber, and an air storage chamber communicating with said main combustion chamber and said intermediate chamber; restricted passage means provided between said main combustion chamber and said intermediate combustion chamber for effecting restricted communication therebetween; nozzle means for injecting fuel into one of said combustion chambers, and valve means associated with said air storage chamber and operable to control the passage of scavenging air therethrough.

12. In combination in a supercharged internal combustion engine: a cylinder; a compression chamber communicating with said cylinder; said compression chamber comprising a main combustion chamber communicating with cylinder, an intermediate combustion chamber, and an air storage chamber communicating with said main combustion chamber and said intermediate chamber; restricted passage means provided between said main combustion chamber and said intermediate combustion chamber for effecting restricted communication therebetween; nozzle means for injecting fuel into one of said combustion chambers, conduit means for conveying charging and scavenging air to said combustion chambers, and check valve means associated with said air storage chamber and arranged for communication with said conduit means.

13. A superchargeable internal combustion engine having a cylinder and a cylinder head connected thereto, which comprises a tubular insert of heat resistant material fixedly mounted in said cylinder head, said insert forming a main combustion chamber communicating with said cylinder, an intermediate combustion chamber, and an air storage chamber communicating with said main combustion chamber and said intermediate combustion chamber, restricted passage means provided between said main combustion chamber and said intermediate combustion chamber for effecting restricted communication there-between; a mixing chamber arranged between said intermediate combustion chamber and said main combustion chamber; and nozzle means for injecting fuel into one of said combustion chambers.

14. A superchargeable internal combustion engine having a cylinder and a cylinder head connected thereto, which comprises a tubular insert of heat resistant material fixedly mounted in said cylinder head and nearly completely surrounded by highly pressure resistant walls, said insert forming a main combustion chamber communicating with said cylinder, an intermediate combustion chamber, and an air storage chamber communicating with said main combustion chamber and said intermediate combustion chamber; restricted passage means provided between said main combustion chamber and said intermediate combustion chamber for effecting restricted communication therebetween; a mixing chamber arranged between said intermediate combustion chamber and said main combustion chamber; and nozzle means for injecting fuel into one of said combustion chambers.

15. A superchargeable internal combustion engine according to claim 14, which includes a layer of poorly heat conducting material interposed between said insert and said highly pressure resistant walls for reducing heat losses from said inserts.

References Cited in the file of this patent

UNITED STATES PATENTS

| | | |
|---|---|---|
| 1,861,362 | Riehm | May 31, 1932 |
| 2,071,241 | Thomas | Feb. 16, 1937 |
| 2,185,918 | Koch | Jan. 2, 1940 |
| 2,731,956 | Schneider | Jan. 24, 1956 |

FOREIGN PATENTS

| | | |
|---|---|---|
| 714,411 | France | Nov. 13, 1931 |
| 695,835 | Germany | Sept. 4, 1940 |